H. S. BEERS.
AERATING AND MIXING DEVICE.
APPLICATION FILED OCT. 3, 1921.

1,417,883.

Patented May 30, 1922.

Inventor:
Henry S. Beers,
by Spear, Middleton, Donaldson & Hall
Attys.

UNITED STATES PATENT OFFICE.

HENRY SAYLORD BEERS, OF NEW YORK, N. Y., ASSIGNOR, BY MESNE ASSIGNMENTS, TO AIR-O-MIX INCORPORATED.

AERATING AND MIXING DEVICE.

1,417,883.        Specification of Letters Patent.        Patented May 30, 1922.

Application filed October 3, 1921. Serial No. 505,090.

*To all whom it may concern:*

Be it known that I, HENRY S. BEERS, a citizen of the United States, and resident of New York, in the county and State of New York, have invented certain new and useful Improvements in Aerating and Mixing Devices, of which the following is a specification.

My present invention relates to improvements in aerating and mixing devices designed to simultaneously aerate and mix fluids or semi-fluids and the invention aims to provide a simple and durable device which will be more efficient in action than previous devices of this type of which I am aware.

The said invention includes the novel features of construction and arrangement and combination of parts hereinafter described and particularly defined by the appended claims, the preferred embodiment of the invention being illustrated in the accompanying drawing in which—

Figure 1:
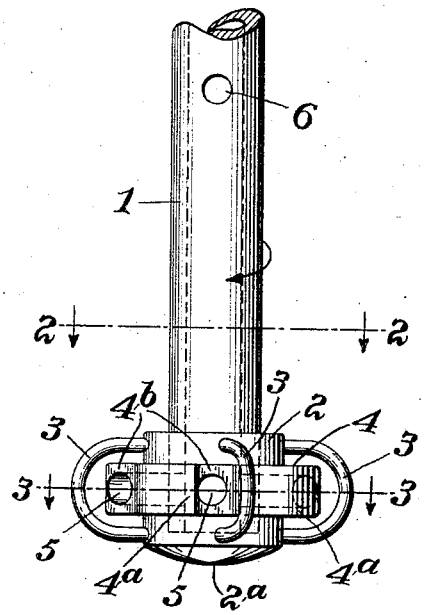
Figure 1 is a side elevation with the upper part of the spindle broken away showing my improved device.
Figure 2:
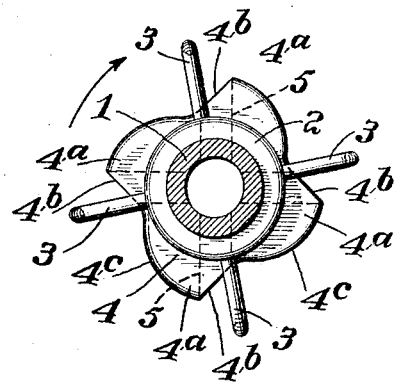
Fig. 2 is a section on line 2—2 of Fig. 1 looking downwardly.
Figure 3:
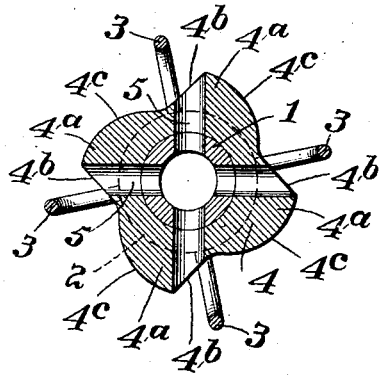
Fig. 3 is a section on line 3—3 of Fig. 1.

Referring by reference characters to this drawing the numeral 1 designates a hollow spindle designed to be connected in the usual or any desired manner with a source of motive power, such for example as an electric motor (not shown). This spindle is provided at its lower end with an enlarged substantially cylindrical portion 2 having a rounded bottom 2ª designed to rest and rotate upon the bottom of the container holding the liquid to be treated. This cylindrical enlargement carries a plurality of loops or bridles 3 which constitute mixing bridges and which have their ends rigidly affixed to the periphery of the cylindrical portion adjacent the top and bottom.

The central portion of the cylindrical enlargement carries an aerating disc or portion 4 which has a plurality of projections 4ª provided with beveled or inclined faces 4ᵇ all facing in one direction and faces 4ᶜ extending from the outer edge of one inclined face to the base of the next succeeding face, preferably on a curve as shown. Passages 5 lead from these faces to the interior of the hollow spindle which is in communication with the atmosphere through a port (or ports 6) located high enough on the spindle to be above the liquid level.

The action of the device is as follows:

The spindle is rotated in a clockwise direction (as indicated in the arrow, Fig. 1) by an electric motor or other source of motive power.

The aerating disc and part of the spindle tube are submerged in the liquid or semi-liquid to be mixed and aerated.

Due to the rotation of the spindle the liquid is forced away from the surfaces 4ᵇ preceding the bevel surfaces 4ᶜ in the direction of rotation. This forcing away of the liquid tends to create a partial vacuum effect at the bevel surfaces, which in turn causes air to pass through the air passages into the liquid immediately surrounding the disc where it is broken into minute bubbles by the mixing bridles or bridges. The rotation of the aerating disc creates a centrifugal force in the liquid immediately surrounding the disc which throws the liquid away from the disc with the fine bubbles of air creating a violent agitation or mixing and aeration of the surrounding liquid.

Having thus described my invention what I claim is:

1. An aerating and mixing device comprising a hollow spindle having its interior designed for atmospheric communication and having at the lower end projecting portions with inclined faces provided with air escape openings and loops cooperating with said openings.

2. An aerating and mixing device comprising a hollow spindle having its interior designed for atmospheric communication and having at the lower end projecting portions with inclined faces provided with air escape openings and loops cooperating with said openings, said projecting portions having curved faces connecting with the outer edge of one inclined face with the base of the next adjoining inclined face.

In testimony whereof, I affix my signature.

HENRY SAYLORD BEERS.